United States Patent [19]
Williams et al.

[11] Patent Number: 5,655,737
[45] Date of Patent: Aug. 12, 1997

[54] SPLIT RUDDER CONTROL SYSTEM AERODYNAMICALLY CONFIGURED TO FACILITATE CLOSURE

[75] Inventors: Edgar P. Williams, Huntington Beach; Norman F. Wasson, Hacienda Heights, both of Calif.; William B. Sears, Grand Prairie, Tex.

[73] Assignee: Northrop Grumman Corporation, Los Angeles, Calif.

[21] Appl. No.: 452,046

[22] Filed: May 24, 1995

Related U.S. Application Data

[63] Continuation-in-part of Ser. No. 981,159, Nov. 24, 1992, abandoned.

[51] Int. Cl.[6] .............................. B64C 3/50; B64C 9/16; B64C 9/20
[52] U.S. Cl. .......................... 244/212; 244/215; 244/216; 244/217
[58] Field of Search .................................. 244/212, 213, 244/215, 216, 217

[56] References Cited

U.S. PATENT DOCUMENTS

| | | | |
|---|---|---|---|
| 1,841,804 | 1/1932 | Hall | 244/212 |
| 1,854,444 | 2/1932 | Barnhardt | 244/215 |
| 1,875,593 | 9/1932 | Hall | 244/212 |
| 1,878,775 | 9/1932 | Henry | 244/215 |
| 1,916,475 | 7/1933 | Hall | 244/212 |
| 1,987,050 | 1/1935 | Burnelli | 244/14 |
| 1,992,158 | 2/1935 | Hall | 244/217 |
| 2,045,463 | 6/1936 | Hall | 244/217 |
| 2,152,835 | 4/1939 | Bolas | 244/217 |
| 2,166,292 | 7/1939 | Hall | 244/217 |
| 2,241,335 | 5/1941 | Wedberg | 244/217 |
| 2,279,615 | 4/1942 | Bugatti | 244/217 |
| 2,411,100 | 11/1946 | Pitt | 244/212 |
| 2,412,647 | 12/1946 | Northrop et al. | 244/13 |
| 3,831,885 | 8/1974 | Kasper | 244/217 |
| 4,466,586 | 8/1984 | Burnham | 244/75 |
| 4,566,657 | 1/1986 | Grow | 244/90 |
| 4,662,588 | 5/1987 | Henderson | 244/118.2 |

FOREIGN PATENT DOCUMENTS

| | | | |
|---|---|---|---|
| 643682 | 4/1937 | Germany | 244/216 |
| 1406373 | 10/1968 | Germany | 244/213 |

*Primary Examiner*—Andres Kashnikow
*Assistant Examiner*—Virna Lissi Mojica
*Attorney, Agent, or Firm*—Terry J. Anderson; Karl J. Hoch, Jr.

[57] ABSTRACT

A split rudder control system for an aircraft which reduces the net opening hinge moments opposing return of the split rudders to the fully closed position from small deflection angles. The split rudder control system provides a smoothly faired aerodynamic protuberance on the upper surfaces of the split rudder control members adjacent to the trailing edge of the wing when the control members are in the closed position and at small deflection angles relative to the closed position. The aerodynamic protuberance smoothly deflects the airstream flow over the upper surface of the wing as it approaches the trailing edge, increasing the local velocity of the airstream at a point forward of the trailing edge. The aerodynamic feature is contoured such that a maximum local airstream velocity occurs generally at the interfacing edges of the control members. The local static pressure at that location is reduced relative to the static pressure at the trailing edge in accordance with Bernoulli's principle, and the reduced pressure is communicated into the control cavity between the control members. The lower control cavity pressure reduces the net opening hinge moments acting on the control members at small deflection angles, facilitating full closure of the control members.

11 Claims, 4 Drawing Sheets

SPLIT RUDDER CONTROL SYSTEM AERODYNAMICALLY CONFIGURED TO FACILITATE CLOSURE

CROSS-REFERENCE TO RELATED APPLICATIONS

This application is a continuation-in-part of commonly-assigned application Ser. No. 07/981,159, filed Nov. 24, 1992, now abandoned.

GOVERNMENT LICENSE RIGHTS

The U. S. Government has a paid-up license in this invention and the right in limited circumstances to require the patent owner to license others on reasonable terms as provided for by the terms of contract number F33657-81-C-0067 awarded by the United States Air Force.

BACKGROUND OF THE INVENTION

1. Field of the Invention

The present invention relates generally to a split rudder control system for an aircraft which reduces the hinge moments opposing full closure of the split rudder control members from small deflection angles.

2. Discussion of the Prior Art

A type of control system for aircraft that has been found to be very effective throughout the flight range includes opposing control members mounted in the upper and lower surfaces of the aircraft wing which provide control forces by upward pivoting movement of the upper control member from its closed or neutral control position and by downward pivoting movement of the lower control member from its closed or neutral control position. The upper and lower surfaces of these control members in their closed positions form portions of the upper and lower surfaces of the wing near the trailing edge, so that the airflow over the wing near the trailing edge is not disturbed.

Such a control system is disclosed in the following U.S. Pat. Nos.: 1,841,804, 1,875,593, 1,916,475, 1,992,158, 2,045,463, and 2,166,292, all to Hall; 1,854,444 to Barnhart; 2,241,335 to Wedberg; 2,279,615 to Bugatti; and 2,412,647 to Northrop. Depending on the relative operation of the left and right hand pairs of such control members on the wings of the aircraft, the split rudders can function as ailerons, elevators, rudders, speedbrakes, and even flaps.

In U.S. Pat. No. 2,412,647 to Northrop et al., such control members are provided primarily for yaw control of a flying wing aircraft. They are disclosed therein as being located on the aft 40% of each wing near the wing tip, and are said to be extendable simultaneously above and below the wing to produce drag.

With the high speeds of modern aircraft, aerodynamic forces generally assist closure of the control members of a split rudder control system. However, large hinge moment forces which oppose return of the control members to the closed position are applied to the opposing control members at small deflection angles from their closed positions. These forces make full closure of the control members to the closed position a design problem, particularly for a lifting wing with positive aft camber and the attendant positive static pressure near the trailing edge of the wing.

The large opening moment forces occur because the high static pressure near the wing trailing edge is communicated into the cavity between the opposing control members, where it acts on the facing surfaces of the opposing control members to produce high opening hinge moments on the upper control member.

While Hall '463 noted above addresses the problem of overcoming the opening hinge moments on the upper split rudders or ailerons at small deflections, the solution provided by that patent is either a fixed trailing edge tab or an external eared tab. Such constructions call for additional materials and accompanying extra weight, and require additional labor to manufacture and assemble the control system. Additionally, such solutions have a detrimental effect on radar signature and therefore would not be suitable for a stealth type of aircraft.

It was with knowledge of the state of the prior art as just discussed that the present invention has been conceived and reduced to practice.

SUMMARY OF THE INVENTION

The present invention relates to a split rudder aircraft control system having upper and lower control members mounted to the aircraft wing and extending spanwise along a length of the wing from respective inboard ends to respective outboard ends.

At least one of the control members is pivotally mounted to the wing for pivotable movement with respect to the other control member between a closed position, where the control members are juxtaposed and proximate to the chord line of the wing, and an open position, where the control members are substantially separated from each other and at least one of the control members is substantially inclined with respect to the plane of the chord line.

The lower control member has a first forward end connected to the wing, a first aft edge, a lower surface extending between the first forward end and the first aft edge, a convex-upward first upper surface extending forward from the first aft edge and away from the lower surface to a peak edge, and an upper opposing surface extending forward and downward from the peak edge toward the lower surface and then curving away from the lower surface and extending forward to the first forward end.

In the closed position, the first aft edge of the lower control member forms a segment of the trailing edge of the wing, and the lower surface forms a portion of the lower surface of the wing. The lower surface thus has an aerodynamic shape which is taught by methods known in the conventional aerodynamic art for that portion of the wing and the applicable aerodynamic design conditions.

The upper control member has a second forward end connected to the wing, a second aft edge, a second upper surface which extends between the second forward end and the second aft edge, and a lower opposing surface extending forward and downward from the second aft edge away from the second upper surface and then curving toward the second upper surface and extending forward to the second forward end.

The second upper surface of the upper control member has a compound shape. Initially, a forward portion extends aft from the second forward end to a forward tangent point (as viewed in cross section). In the closed position, the forward portion forms a portion of the upper surface of the wing, and thus has a shape as taught by methods known in the conventional aerodynamic art for that portion of the wing and the applicable aerodynamic design conditions.

From the forward tangent point, however, a transition portion of the second upper surface extends aft in a concave-upward direction away from the lower opposing surface to an aft tangent point (again as viewed in cross section), and an aft portion of the second upper surface extends in a convex-upward direction from the aft tangent point to the second aft edge.

In the closed position, the second aft edge of the upper control member is positioned proximate to, but spaced from and forward of, the peak edge of the lower control member. In that position and at small deflection angles from it, the upper and lower opposing surfaces define a control cavity between the control members which has an entry slot bounded by the second aft edge of the upper control member and the peak edge of the lower control member.

In the closed position, the transition portion of the second upper surface of the upper control surface is a concave-upward curved surface extending away from the plane of the wing chord line. The aft portion of the second upper surface of the upper control member is a convex-upward curved surface extending away from the plane of the wing chord line, and the first upper surface of the lower control member is a convex-upward curved surface extending away from the plane of the wing chord line. Also, the first upper surface of the lower control member has a maximum spacing from the plane of the chord line at the peak edge.

At high airspeeds and low control member deflection angles from the closed position, the control members of a conventional split rudder control system are subjected to large opening hinge moments which oppose movement of the control members to the closed position, because the high pressure from the positive pressure field near the trailing edge of the wing is communicated into the control cavity between the control members.

To reduce these large opening hinge moments, the present invention provides an aerodynamic feature in the form of a smoothly faired protuberance or "bump" on the upper surface of the wing adjacent its trailing edge when the control members are at or near the closed position. The aerodynamic feature is formed by the upper surfaces of the upper and lower control members, which together smoothly deflect the airstream flow over the control members first away from and then toward the plane of the wing chord line as it approaches the trailing edge.

Because the first upper surface of the lower control member in the closed position is spaced a maximum distance from the plane of the wing chord line at the peak edge, the protuberance or "bump" has a maximum "height" (relative to the surface taught by the conventional aerodynamic art for that region of the wing) located generally at the entry slot. The air stream velocity over the control surfaces approaching the trailing edge of the wing is therefore increased in the vicinity of the entry slot to a local maximum and, by the Bernoulli effect, the local positive static pressure in the vicinity of the entry slot is reduced to a local minimum which is less than the static pressure forward of the protuberance and at the trailing edge.

This locally-reduced pressure is communicated through the entry slot to the control cavity between the control members. The cavity pressure applied to the opposing surfaces of the control members of the present invention is reduced, thereby reducing the hinge moments which oppose closure of the control members.

The present invention is readily and inexpensively implemented. The additional material required to form the upper surfaces of the control members in the manner described above is negligible, and does not significantly increase aircraft weight. Also, existing aircraft employing split rudder control systems can be easily retrofitted to implement the present invention.

Still another benefit of the invention is that it entails no use of the external tabs and operating mechanisms of the invention of, for example, Hall '463. Furthermore, it has been found that the aerodynamic feature of the present invention does not adversely increase aerodynamic drag or radar cross section, the latter being a valuable attribute of the invention for use in a stealth type of aircraft.

Other and further features, advantages, and benefits of the present invention will become apparent in the following description taken in conjunction with the following drawings. It is to be understood that the foregoing general description and the following detailed description are exemplary and explanatory but are not to be restrictive of the invention. The accompanying drawings, which are incorporated in and constitute a part of this invention, illustrate one of the embodiments of the invention and, together with the description, serve to explain the principles of the invention in general terms. Like numerals refer to like parts throughout the disclosure.

DETAILED DESCRIPTION OF THE PREFERRED EMBODIMENT

Figure 1:
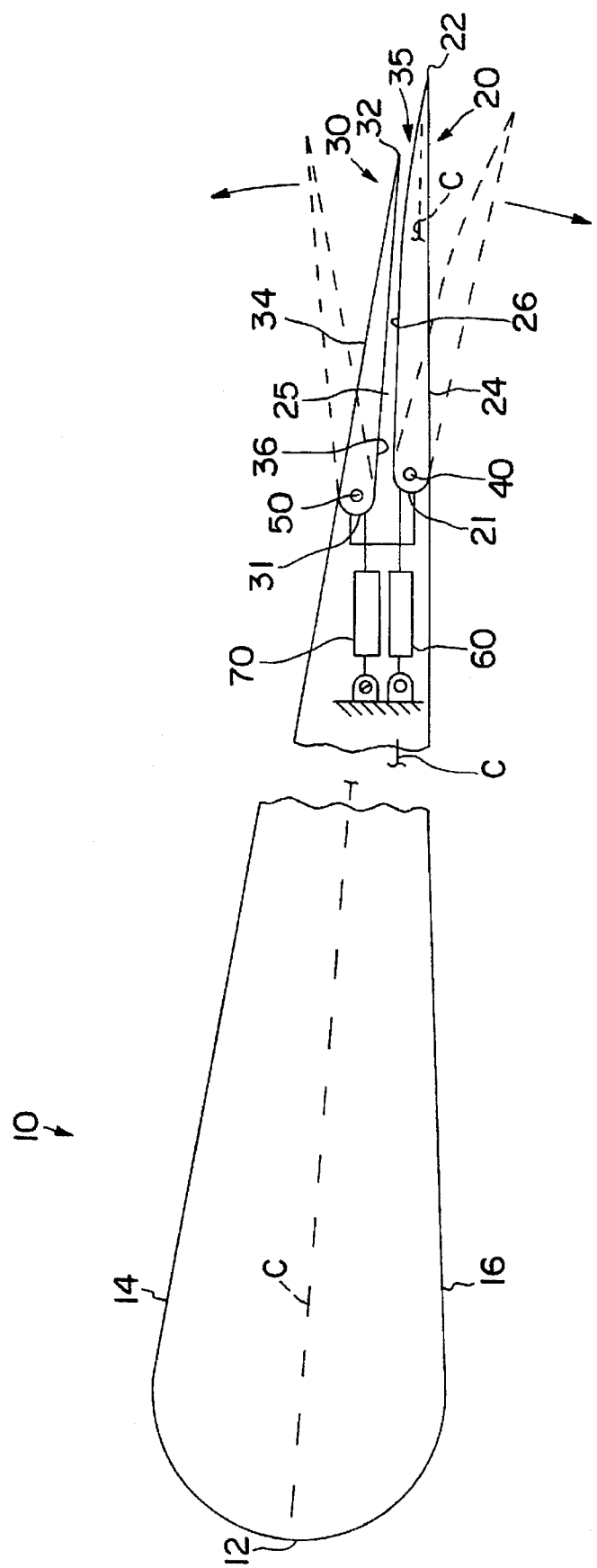
FIG. 1 is a side elevation view, in section, of a wing equipped with a conventional split rudder control system illustrating typical operating positions of the upper and lower control members.

Turning now to the drawings and, initially, to FIG. 1, there is shown a cross sectional view of an aircraft wing 10 equipped with a conventional split rudder control system having a lower control member 20 and an upper control member 30.

Wing 10 has an aerodynamic profile in cross section which is determined for a selected operational flight environment by methods known to those skilled in the aerodynamic art. Wing 10 extends between a leading edge 12 and a trailing edge which, in FIG. 1, is coincident with aft edge 22 of lower control member 20. Wing 10 also has an upper wing surface 14 and a lower wing surface 16 which extend from leading edge 12 to the trailing edge. Chord line C extends between the leading edge 12 and the trailing edge, i.e. aft edge 22 as shown in FIG. 1.

Lower control member 20 is pivotally mounted to wing 10 about a lower control axis 40 which is spaced forward from and generally parallel with aft edge 22 of lower control member 20. Lower control member 20 includes a forward end 21, aft edge 22, and a lower surface 24 and an upper opposing surface 26 which each extend between forward end 21 and aft edge 22.

A suitable lower actuator 60 is mounted to lower control member 20 and wing 10 and is operable to deflect lower control member 20 between a closed position as indicated by the solid lines in FIG. 1 and an open position as indicated by the dashed lines.

In a similar manner, upper control member 30 is pivotally mounted to wing 10 about upper control axis 50 which is also spaced forward from and generally parallel to aft edge 22 of lower control member 20. Upper control member 30 has a forward end 31, an aft edge 32, and an upper surface 34 and a lower opposing surface 36 which each extend between forward end 31 and aft edge 32.

A suitable upper actuator 70 is also mounted to upper control member 30 and wing 10 and is operable to move upper control member 30 between a closed position as indicated by the solid lines in FIG. 1 and an open position as indicated by dashed lines.

In the closed position, the lower and upper control members 20, 30 are substantially juxtaposed and proximate to the plane of chord line C. In the open position the control members are substantially separated and at least one of the control members 20, 30 is substantially inclined with respect to the plane of chord line C.

Lower and upper control members 20 and 30 respectively extend spanwise along an aft portion of a length of wing 10 between respective inboard ends and respective outboard ends.

In the conventional split rudder control system shown in FIG. 1, the upper surface 34 of upper control member 30 and the lower surface 24 of lower control member 20 in their closed positions form portions of upper wing surface 14 and lower wing surface 16, respectively, so that the airstream flow over wing 10 near the trailing edge as taught by the conventional aerodynamic art is not disturbed.

Lower and upper control members 20 and 30 therefore have smoothly tapering shapes from their respective forward ends 21, 31 to their respective aft edges 22, 32. Also, aft edge 32 of upper control member 30 is spaced forward from and generally parallel with aft edge 22 of lower control member 20.

The opposing surfaces 26, 36 of the lower and upper control members 20, 30 in and near the closed position are substantially juxtaposed and proximately positioned, and thus define a control cavity 25 between control members 20, 30. Entry slot 35 to control cavity 25 is defined by the gap between aft edge 32 of upper control member 30 and upper opposing surface 26 of lower control member 20.

For small control member deflection angles, the high static pressure of the airflow over wing 10 near the trailing edge is therefore readily communicated into control cavity 25 through entry slot 35 and is applied to the opposing surfaces 26, 36 of control members 20, 30 to create the high opening hinge moments about control axes 40, 50. These opening hinge moments oppose the return of control members 20, 30 to the closed position.

Figure 2:
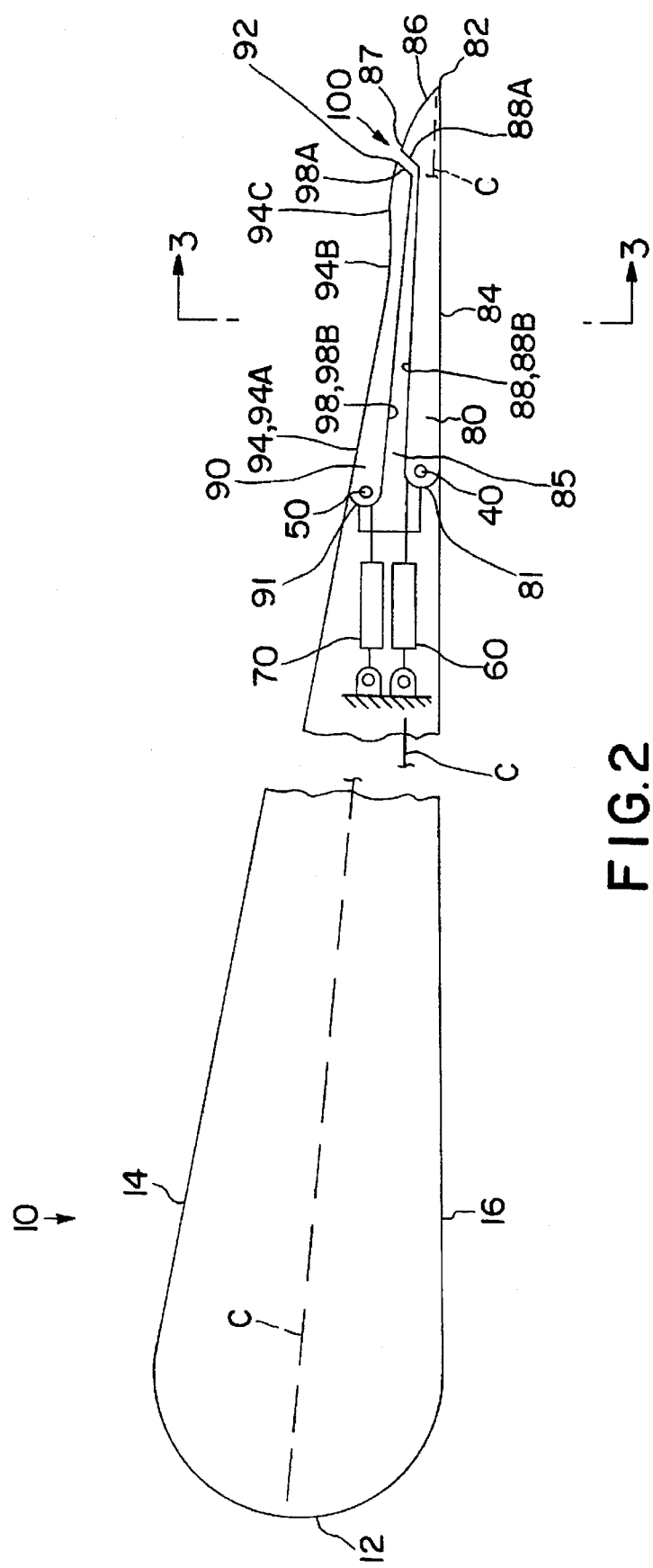
FIG. 2 is a side elevation view, in section, of a wing equipped with a split rudder control system of the present invention, with the upper and lower control members shown in the closed position, the aerodynamic feature of the invention being shown in an enlarged scale.

In FIG. 2, a split rudder control system in accordance with the invention, comprising lower and upper control members 80, 90, respectively, is shown on wing 10 with control members 80, 90 in the closed position. In the closed position, lower and upper control members 80, 90 are substantially juxtaposed and proximate to the plane of chord line C. In the open position, the control members are substantially separated and at least one of the control members 80, 90 is substantially inclined with respect to the plane of chord line C.

Wing 10 extends between leading edge 12 and a trailing edge which, in FIG. 2, is coincident with a first aft edge 82 of lower control member 80. Wing 10, as before, has an upper wing surface 14 and a lower wing surface 16 which each extend from leading edge 12 to the trailing edge. Chord line C extends between the leading edge 12 and the trailing edge, i.e. first aft edge 82 as shown in FIG. 2.

In accordance with the invention, lower and upper control members 80 and 90 are pivotally secured to wing 10 about lower and upper control axes 40 and 50 respectively.

Lower control member 80 has a first forward end 81 pivotally connected to wing 10 by lower control axis 40, which is spaced forward from and generally parallel with first aft edge 82. Lower control member 80 also has a lower surface 84 which extends between first forward end 81 and first aft edge 82, and a convex-upward first upper surface 86 which extends forward from first aft edge 82 and away from lower surface 84 to a peak edge 87. Upper opposing surface 88 has a first aft region 88A which extends forward and downward from peak edge 87 toward lower surface 84 and then curves away from lower surface 84 and a first forward region 88B which extends forward to first forward end 81.

In the closed position, first aft edge 82 of lower control member 80 forms a segment of the trailing edge of wing 10, and lower surface 84 forms a portion of lower wing surface 16 of wing 10. Lower surface 84 thus has an aerodynamic shape as taught by the conventional aerodynamic art for that portion of wing 10 and the applicable aerodynamic design conditions.

Upper control member 90 has a second forward end 91 pivotally connected to wing 10 by upper control axis 50, which is also spaced forward from and generally parallel to first aft edge 82 of lower control member 80. In the embodiment shown in FIG. 2, upper control axis 50 is shown positioned forward of and above lower control axis 40, but may be positioned at other locations in other design configurations.

Upper control member 90 has a second upper surface 94 which extends aft from second forward end 91 to second aft edge 92, and a lower opposing surface 98 having a second aft region 98A which extends forward and downward from second aft edge 92 away from second upper surface 94 and then curves toward second upper surface 94 and a second forward region 98B which extends forward to second forward end 91.

Lower and upper actuators 60 and 70 are respectively secured to wing 10 and to lower and upper control members 80, 90. Lower and upper actuators 60, 70 are operated to move the respective lower and upper control members 80, 90 between their closed positions shown in FIG. 2 and open positions corresponding to the dashed line positions shown in FIG. 1 for lower and upper control members 20, 30. Chord line C extends between the leading edge 12 of wing 10 and the wing trailing edge, which in FIG. 2 is coincident with first aft edge 82 of lower control member 80.

Figure 3:
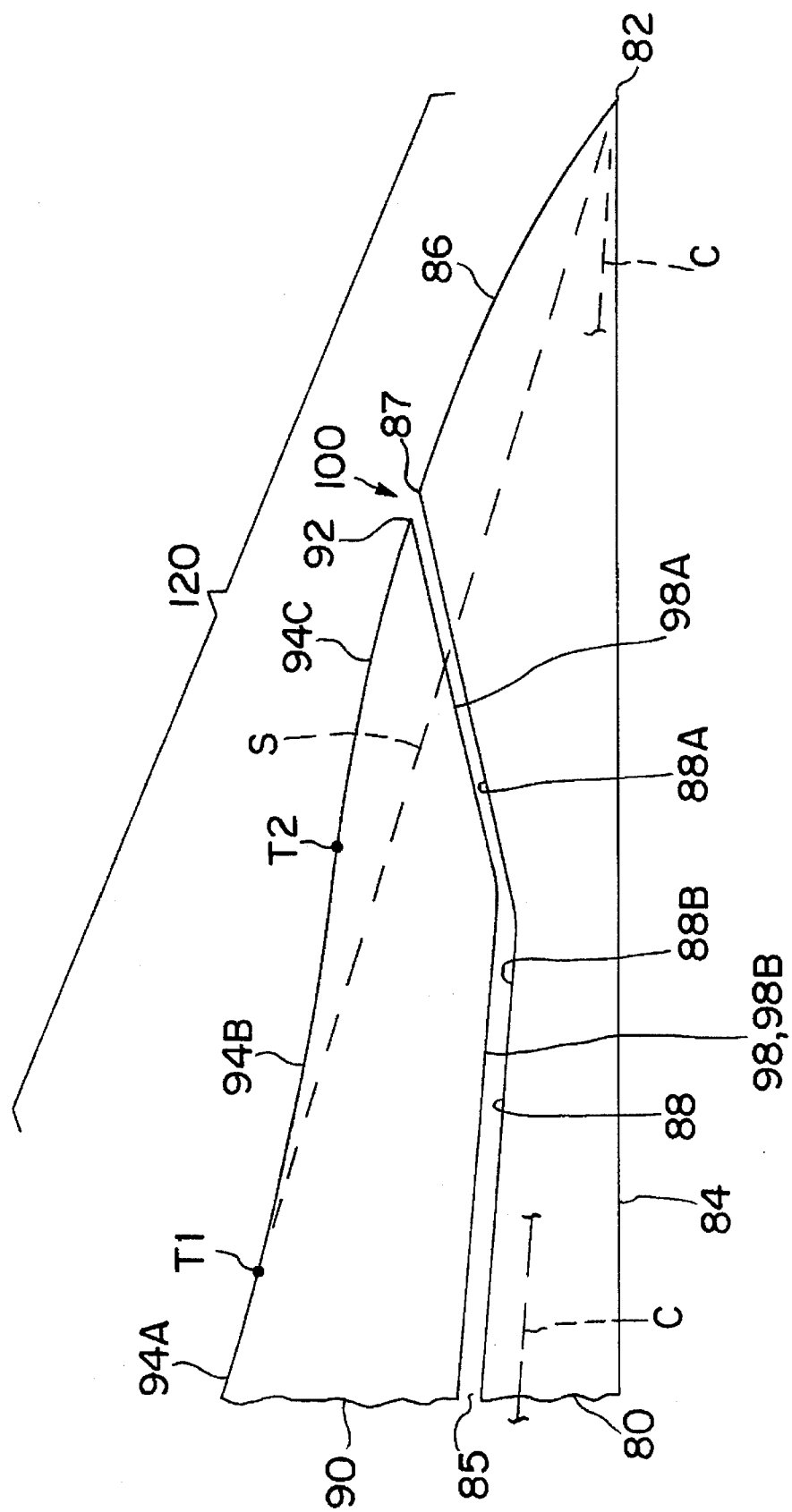
FIG. 3 is an enlarged cross-sectional view of the portions of the upper and lower control members aft of arrows 3—3 shown in FIG. 2.

The second upper surface 94 of upper control member 90 has a compound shape. Initially, as seen in FIG. 2, a forward portion 94A extends aft from second forward end 91 to a forward tangent point T1 (FIG. 3). In the closed position, forward portion 94A forms a portion of upper surface 14 of wing 10, and thus has a shape as taught by the conventional aerodynamic art for that portion of wing 10 and the applicable aerodynamic design conditions.

From forward tangent point T1, however, and turning now to FIG. 3, transition portion 94B of second upper surface 94 extends aft in a concave-upward direction away from lower opposing surface 98 to aft tangent point T2, and aft portion 94C of second upper surface 94 extends aft in a convex-upward direction away from lower opposing surface 98 from aft tangent point T2 to second aft edge 92.

It is to be understood that the transition and aft portions 94B, 94C and first upper surface 86 have been shown in enlarged scale in FIG. 2 for illustrative purposes, and are shown in more proper perspective with control members 80, 90 in FIG. 3.

In the closed position, second aft edge 92 of upper control member 90 is positioned proximate to, but spaced from and forward of, peak edge 87 of lower control member 80. In that position and at small deflection angles from it, lower and upper opposing surfaces 88, 98 are substantially juxtaposed and proximately positioned, thereby defining a control cavity 85 between control members 80, 90. An entry slot 100 to control cavity 85 is bounded by second aft edge 92 of upper control member 90 and peak edge 87 of lower control member 80. It is to be understood that the shape of control cavity 85 as shown in FIGS. 2-3 is illustrative, and that other control cavity configurations may be required by other individual design considerations.

In the closed position, transition portion 94B of second upper surface 94 is a concave-upward curved surface extending away from the plane of the wing chord line C. Also, aft portion 94C of second upper surface 94 and first upper surface 86 are convex-upward curved surfaces extending away from the plane of the wing chord line C. First upper surface 86 of lower control member 80 has a maximum spacing from the plane of wing chord line C at peak edge 87.

Unlike the control members 20, 30 of the conventional split rudder control system shown in FIG. 1, the lower and upper control members 80, 90 of the present invention do not have a smoothly tapering shape from respective forward ends 81, 91 to respective aft edges 82, 92. Although lower surface 84 of lower control member 80 and forward portion 94A of upper surface 94 of upper control member 94 in their respective closed positions form portions of lower wing surface 16 and upper wing surface 14, respectively, of wing 10 as taught by the conventional aerodynamic art, first upper surface 86 of lower control member 80 and transition and aft portions 94B, 94C of upper surface 94 of upper control member 90 are not conventional aerodynamic extensions of upper wing surface 14 of wing 10.

In accordance with the invention, the transition and aft portions 94B and 94C of upper surface 94 of upper control member 90 and first upper surface 86 of lower control member 80 together form an aerodynamic feature 120 in the shape of a smoothly-contoured protuberance or "bump" when those members are at or near their respective closed positions. The incident airstream must flow over this aerodynamic feature 120 as it approaches the trailing edge of wing 10.

Because first upper surface 86 of lower control member 80, in its closed position, is spaced a maximum distance from the plane of wing chord line C at peak edge 87, aerodynamic feature 120 has a maximum "height," relative to the surface taught by the conventional aerodynamic art for that region of the wing (shown as dotted line S in FIG. 3), located generally at entry slot 100. The air stream velocity over upper surfaces 94 and 86 of control members 80, 90 approaching the trailing edge of wing 10 is therefore increased in the vicinity of entry slot 100 to a local maximum and, by the Bernoulli effect, the local static pressure in the vicinity of entry slot 100 is reduced to a local minimum which is less than the static pressure at the trailing edge of wing 10.

This locally-reduced pressure is communicated through entry slot 100 to control cavity 85. The control cavity pressure applied to the opposing surfaces 88, 98 of control members 80, 90 of the present invention is accordingly lower than the control cavity pressure of conventional split rudder control systems, thereby reducing the hinge moments which oppose closure of the control members 80, 90.

As the deflection angle for each of the control members of a split rudder control system, whether a conventional system as shown in FIG. 1 or a system in accordance with the present invention as shown in FIGS. 2-3, becomes very small, as for example approximately 10° or less, the pressure in the control cavity between the control members and the net opening hinge moment acting against closure becomes greater and greater until the control members are nearly fully closed, as for example deflections of less than about 1°-2°. This can be clearly seen in FIG. 4, which presents a graph of upper control member hinge moment coefficient as a function of control member deflection angle. A negative coefficient indicates a net opening hinge moment acting against closure.

Figure 4:
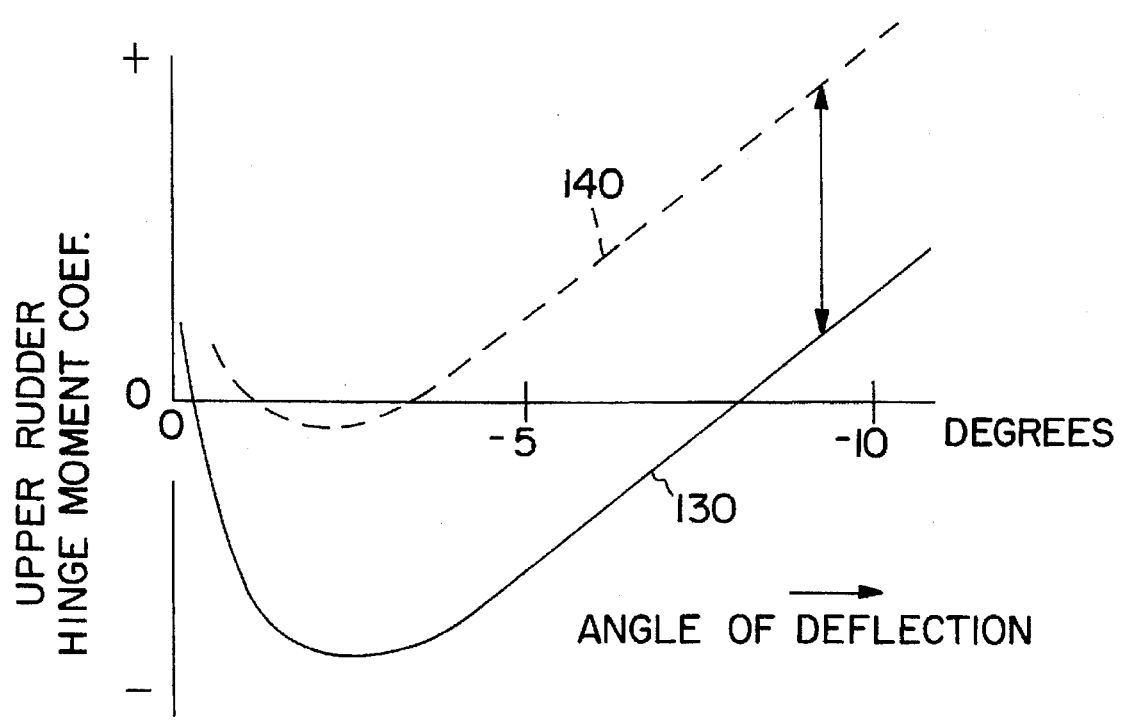
FIG. 4 is a graph comparing the hinge moment coefficient of an upper control member of a conventional split rudder control system compared to the hinge moment coefficient of an upper control member of the split rudder control system of the present invention.

In FIG. 4, curve 130 represents the hinge moment coefficient for the upper control member of a conventional split rudder control system, while curve 140 represents the hinge moment coefficient for the upper control member of a split rudder control system in accordance with the present invention. As is apparent from FIG. 4, the present invention significantly reduces the net opening hinge moments on the upper control member of a split rudder control system at small deflection angles from those of the split rudder control systems of the prior art.

Although changes to the pressure distributions on the exterior surfaces of the upper and lower control members also affect the hinge moments experienced by the control members, these changes tend to be self-canceling, and are overcome by the larger effects of the control cavity pressure.

While preferred embodiments of the invention have been disclosed in detail, it should be understood by those skilled in the art that various other modifications may be made to the disclosed embodiments without departing from the scope of the invention as described in the specification and defined in the appended claims.

What is claimed is:

1. A split rudder control system for an aircraft, comprising:
    a wing having a leading edge, a trailing edge, an upper wing surface, a lower wing surface, and a chord line;
    a lower control member mounted to said wing, said lower control member having
        a first forward edge,
        a first aft edge,
        a lower surface extending between said first forward edge and said first aft edge,
        a convex-upward first upper surface extending forward from said first aft edge and away from said lower surface to a peak edge,
        and an upper opposing surface extending between said peak edge and said first forward end, said upper opposing surface having a first aft region extending forward from said peak edge toward said lower surface then curving away from said lower surface, and a first forward region extending forward from said first aft region to said first forward end;
    an upper control member mounted to said wing, said upper control member having
        a second forward edge,
        a second aft edge,
        a second upper surface extending between said second forward edge and said second aft edge, said second upper surface having a forward portion extending aft from said second forward end to a first tangent point, a transition portion extending aft from said first tangent point to a second tangent point, and an aft portion extending aft from said second tangent point to said second aft edge, and a lower opposing surface extending between said second forward edge and said second aft edge, said lower opposing surface having a second aft region extending forward from said second aft edge in a downward direction away from said aft portion of second upper surface then curving toward said forward portion of said second upper surface, and a second forward portion extending forward from said second aft region to said second forward end, said transition portion of said second upper surface being a concave-upward surface extending away from said second forward region of said lower opposing surface, said aft portion of said second upper surface being a convex-upward surface extending toward said second aft region of said lower opposing surface; and, means for pivotally moving at least one of said lower control member and said upper control member about a control axis between a closed position whereat said upper and lower opposing surfaces are substantially juxtaposed and proximate to a plane of said chord line of said wing and an open position whereat said at least one of said lower control member and said upper control member is substantially separated from said other of said lower control member and said upper control member and is substantially inclined with respect to said plane of said chord line.

2. The split rudder control system as claimed in claim 1 wherein said at least one of said lower control member and said upper control member is said upper control member.

3. The split rudder control system as claimed in claim 1 wherein said at least one of said lower control member and said upper control member is said lower control member.

4. The split rudder control system as claimed in claim 1 wherein said at least one of said lower control member and said upper control member is said upper control member and said lower control member.

5. The split rudder control system as claimed in claim 1 wherein said means for pivotally moving comprises a lower actuator connected to said wing and to said lower control member.

6. The split rudder control system as claimed in claim 1 wherein said means for pivotally moving comprises an upper actuator connected to said wing and to said upper control member.

7. The split rudder control system as claimed in claim 1 wherein said control axis is an upper control axis spaced forward of and generally parallel to said first aft edge of said lower control member in said closed position.

8. The split rudder control system as claimed in claim 1 wherein said control axis is a lower control axis spaced forward of and generally parallel to said first aft edge of said lower control member in said closed position.

9. The split rudder control system as claimed in claim 1 wherein, in said closed position of said upper control member and said lower control member, said transition portion of said second upper surface is a concave-upward surface extending away from said plane of said chord line, said aft portion of said second upper surface is a convex-upward surface extending away from said plane of said chord line, and said first upper surface of said lower control member is a convex-upward surface extending away from said plane of said chord line.

10. The split rudder control system as claimed in claim 9 wherein, in said closed position of said upper control member and said lower control member, said transition portion and said aft portion of said second upper surface of said upper control member and said first upper surface of said lower control member form a smoothly contoured aerodynamic feature adjacent said trailing edge.

11. The split rudder control system as claimed in claim 10 wherein said aerodynamic feature smoothly deflects airstream flow over said upper wing surface approaching said trailing edge initially away from said plane of said chord line and thence toward said plane of said chord line, whereby a velocity of said airstream flow is increased to a local maximum velocity at a location forward of said trailing edge generally proximate said peak edge and said second aft edge and a local static pressure at said location is reduced relative to a static pressure at said trailing edge, said reduced local static pressure being communicated into said control cavity and reducing net opening hinge moments acting on said upper and lower control members.

* * * * *